United States Patent
Mulder et al.

(10) Patent No.: US 11,993,042 B2
(45) Date of Patent: May 28, 2024

(54) STITCHING ROLLER FOR STITCHING A STRIP

(71) Applicant: VMI HOLLAND B.V., Epe (NL)

(72) Inventors: Gerben Mulder, Epe (NL); Henrick Theodoor Posthumus, Epe (NL)

(73) Assignee: VMI HOLLAND B.V., Epe (NL)

( * ) Notice: Subject to any disclaimer, the term of this patent is extended or adjusted under 35 U.S.C. 154(b) by 0 days.

(21) Appl. No.: 17/769,545

(22) PCT Filed: Sep. 7, 2020

(86) PCT No.: PCT/NL2020/050549
§ 371 (c)(1),
(2) Date: Apr. 15, 2022

(87) PCT Pub. No.: WO2021/086173
PCT Pub. Date: May 6, 2021

(65) Prior Publication Data
US 2023/0166470 A1    Jun. 1, 2023

(30) Foreign Application Priority Data
Oct. 31, 2019   (NL) .................................. 2024128

(51) Int. Cl.
*B29D 30/14*   (2006.01)
*B29D 30/28*   (2006.01)
*B29C 65/62*   (2006.01)

(52) U.S. Cl.
CPC ............ *B29D 30/14* (2013.01); *B29D 30/28* (2013.01); *B29C 65/62* (2013.01)

(58) Field of Classification Search
CPC ................... B29D 30/14; B29D 30/28; B29D 2030/3257; B29D 2030/3264;
(Continued)

(56) References Cited

U.S. PATENT DOCUMENTS 1,509,705 A * 9/1924 Broulhiet .................. B60B 5/04
152/7
1,682,899 A * 9/1928 Fletcher .............. B60B 33/0028
16/45

(Continued)

FOREIGN PATENT DOCUMENTS

CN    101665005 A    3/2010
CN    105473320 A    4/2016
(Continued)

OTHER PUBLICATIONS

Machine translation of DE 10011101-A1, patent document published Aug. 16, 2001.*

(Continued)

*Primary Examiner* — Sedef E Paquette
(74) *Attorney, Agent, or Firm* — Workman Nydegger

(57) ABSTRACT

A stitching roller is provided for stitching a strip, in particular a continuous strip for strip-winding. The stitching roller includes a roller body that is rotatable about a roller axis. The roller body comprises a circumferential member and a support member provided with a connection end that is connected to the circumferential member and a base end for coupling of the stitching roller to a rotation shaft. The support member is made of a flexible material that allows for the circumferential member to tilt relative to the base end from a neutral orientation into a tilted orientation. The support member includes one or more reinforcements that reinforce the axial stiffness of the support member from the outer radius towards the inner radius.

28 Claims, 5 Drawing Sheets

(58) Field of Classification Search
CPC ... B29D 99/0032; B29C 59/04; B29C 59/043; B29C 66/81611; B29C 66/81457; B29C 66/81453; B29C 65/62; F16C 13/00; F16D 3/58; B21B 27/05
USPC .................................................. 156/410, 421
See application file for complete search history.

(56) References Cited

U.S. PATENT DOCUMENTS

| | | | |
|---|---|---|---|
| 2,936,023 | A | 5/1960 | Giletta et al. |
| 3,156,601 | A | 11/1964 | Henley |
| 4,004,961 | A * | 1/1977 | Takasuga ............... B29D 30/28 91/405 |
| 4,341,584 | A | 7/1982 | Czernichowsky |
| 8,684,058 | B2 | 4/2014 | Byerley |
| 10,451,133 | B2 | 10/2019 | Kume et al. |
| 11,104,091 | B2 | 8/2021 | Dijkstra et al. |
| 2006/0048884 | A1 * | 3/2006 | Kudo ..................... B29D 30/28 156/412 |
| 2009/0188607 | A1 | 7/2009 | Tatara et al. |
| 2011/0024053 | A1 | 2/2011 | Byerley |
| 2013/0206340 | A1 | 8/2013 | Tatara et al. |
| 2016/0151990 | A1 | 6/2016 | Dijkstra et al. |
| 2018/0172101 | A1 | 6/2018 | Kume et al. |
| 2018/0345611 | A1 | 12/2018 | Lorenz et al. |
| 2021/0354412 | A1 | 11/2021 | Dijkstra et al. |

FOREIGN PATENT DOCUMENTS

| | | |
|---|---|---|
| CN | 215095793 U | 12/2021 |
| DE | 2520947 A1 | 12/1975 |
| DE | 10011101 A1 * | 8/2001 |
| EP | 1625931 A1 | 2/2006 |
| EP | 1625931 B1 | 9/2008 |
| EP | 2286986 B1 | 3/2013 |
| GB | 1360070 | 7/1971 |
| JP | 2007076221 A | 3/2007 |
| JP | 2010052260 A | 3/2010 |
| JP | 2011102023 A * | 5/2011 |
| JP | 2012192684 A * | 10/2012 |
| JP | 5089532 B2 | 12/2012 |
| JP | 2015136897 A | 7/2015 |
| JP | 2016002685 A * | 1/2016 |
| JP | 6280374 B2 | 2/2018 |
| WO | 2004055406 A1 | 7/2004 |
| WO | 2009125238 A1 | 10/2009 |

OTHER PUBLICATIONS

Miyakoshi Y, JP-2016002685-A, machine translation. (Year: 2016).*
Masuda K, JP-2011102023-A, machine translation. (Year: 2011).*
Tanaka H, JP-2012192684-A, machine translation. (Year: 2012).*
Korean Office Action from corresponding Korean Patent Application No. 10-2022-7018100, dated Nov. 9, 2022.
Netherlands Search Report and Written Opinion from corresponding NL Application No. 2024128, dated Jun. 16, 2020.
International Search Report and Written Opinion from corresponding PCT Application No. PCT/NL2020/050549, dated Nov. 10, 2020.
Japanese Office Action from corresponding JP Application 2020-580179, dated Feb. 21, 2022.
Chinese Office Action from corresponding Chinese Application No. 202011147004.4, dated Sep. 5, 2022.

* cited by examiner

STITCHING ROLLER FOR STITCHING A STRIP

BACKGROUND

The invention relates to a stitching roller for stitching a strip, in particular a strip for manufacturing a tire on a tire building drum. More specifically, the invention relates to a stitching roller for stitching a continuous strip during strip-winding on a strip-winding drum.

During strip-winding, the first winding of the strip can be applied to the strip-winding drum in a substantially flat orientation. The subsequent windings of the strip are typically placed in an overlapping arrangement in which the orientation of the strip is at different oblique angles to the surface of the strip-winding drum. To correctly stitch the strip in those subsequent windings, the orientation of the stitching roller needs to be changed accordingly.

EP 2 286 986 B1 discloses a prior art pressure roller with an outer layer of sponge material and an inner layer of rubber-like elastic material. EP 2 286 986 B1 proposes the use of a segmented roller that is divided axially into a plurality of roller segments that can move independently in the radial direction to more reliably press on the unevenness caused by an overlapping portion of a strip. The pressure roller itself is maintained in the same orientation during the pressing.

JP 6280374 B2 discloses a rubber strip pressing device, see also FIG. 1, that can freely oscillate a pressing roller while making the pressing roller follow inclinations of a drum and a rubber strip which is supplied on the drum. The pressing roller is supported by a tilting body to adapt the orientation of the rigid pressing roller as a whole to the orientation of the rubber strip on the drum.

FIG. 2 discloses another known stitching roller according to the preamble of claim 1. The support member of this stitching roller is made from a flexible material and has a constant width in the axial direction. As a result, the support member can deflect along its entire radial length L in response to load on the stitching surface to allow the stitching surface to tilt into a tilted orientation relative to the strip on the strip-winding drum.

SUMMARY OF THE INVENTION

A disadvantage of the pressure roller according to EP 2 286 986 B1 is that it consists of many parts and is relatively complex. The pressing roller according to JP 6280374 B2 is relatively simple, but it requires a relatively complex control. In particular, as schematically shown in FIG. 1, the tilting of the pressing roller as a whole is insufficient to correctly position the pressing roller relative to the strip. A further displacement in X and Y directions is required relative to the neutral position of the pressing roller to properly position the pressing roller. The known stitching roller of FIG. 2 does not have this particular drawback. However, as the support member deflects along its entire radial length L, it can be observed that, in addition to the tilt of the stitching surface, the center of the stitch surface with respect to the center of the stitching roller is shifted slightly in the axial direction. Consequently, also for this stitching roller, a small correction in the X direction is required to accurately position the stitching roller relative to the strip on the strip-winding drum.

It is an object of the present invention to provide a stitching roller for stitching a strip on a strip-winding drum, wherein the stitching roller can be positioned more accurately with respect to the strip on the strip-winding drum. It is further an object of the present invention to provide the use of said stitching roller on a strip-winding drum, wherein the use can be improved by improving the positioning of the stitching roller relative to the strip on said strip-winding drum.

According to a first aspect, the invention relates to a stitching roller for stitching a strip, wherein the stitching roller comprises a roller body that is rotatable about a roller axis, wherein the roller body comprises a circumferential member having a circumference extending about the roller axis, wherein the circumferential member defines a stitching surface that, considered in a radial direction perpendicular to the roller axis, faces away from the roller axis and an internal surface that, considered in the radial direction, faces towards the roller axis, wherein the roller body further comprises a support member extending in a circumferential direction about the roller axis for supporting the circumferential member relative to a rotation shaft, wherein the support member has a connection end that is connected to the circumferential member at the internal surface, a base end for coupling of the stitching roller to the rotation shaft and a radial length in the radial direction between the base end and the connection end, wherein the circumferential member is elastically deformable about the circumferential direction, in particular in a tilt direction about the circumferential direction, wherein the support member is made of a flexible material that allows for the circumferential member to tilt relative to the base end from a neutral orientation into a tilted orientation at at least one position along the circumference, wherein the support member, in the neutral orientation of the circumferential member, has an inner radius at the base end, an outer radius at the connection end and a middle radius at the middle between the inner radius and the outer radius, characterized in that the support member, in an axial direction parallel to the roller axis, comprises a first reinforcement at the middle radius that reinforces the axial stiffness of the support member with respect to the axial stiffness of the support member at the outer radius. Preferably, the support member comprises a second reinforcement at the inner radius that reinforces the axial stiffness of the support member with respect to the axial stiffness of the support member at the outer radius to the same extend as or to a greater extent than the first reinforcement.

To properly position the stitching surface relative to one of the windings of the strip on the strip-winding drum, the Applicant has found that it is ideal if the circumferential member is tilted about a tilt point as close as possible to or near the circumferential member. When the pivot point is close to the circumferential member, the circumferential member can essentially tilt about itself with virtually no displacement or offset of the center of the circumferential member in the axial direction and/or the radial direction. Hence, all or at least a considerable part of the stitching force exerted onto the stitching roller in the radial direction can be transferred via the circumferential member onto the windings of the strip to reliably stitch said windings. The reinforcement of the support member towards the base end effectively weakens the support member in a position close to the stitching surface of the circumferential member. As a result, the tilt point can be located very close to the stitching surface of the circumferential member.

In the context of the present invention, the 'axial stiffness' has to be interpreted as the extent to which the support member resists deformation in response to a force or a component of said force applied to the support member in or parallel to the axial direction. In other words, the axial stiffness of the support member determines how difficult it is to deflect the support member in the axial direction when a force is applied to said support member in the axial direction. In the present invention, the support member has an axial stiffness at the outer radius that is smaller than the axial stiffness of the support member at the position of the first reinforcement. Alternatively formulated, the support member is less flexible in the axial direction at the first reinforcement compared to the flexibility of the support member in the axial direction at the outer radius.

In a preferred embodiment the support member, in the neutral orientation of the circumferential member and in the axial direction, has a base width at the inner radius, a middle width at the middle radius and a connection width at the outer radius, wherein the first reinforcement is formed by the middle width being larger than the connection width and/or wherein the second reinforcement is formed by the base width being larger than or equal to the middle width. The connection width is relatively small with respect to the middle width and/or the base width and thus has a relatively low stiffness against axial forces.

In another embodiment the support member, in the neutral orientation of the circumferential member has a decreasing width from the base end towards the connection end at at least three evenly distributed radial distances along the radial length of the support member from the connection end. In other words, the support member, in the neutral orientation of the circumferential member, tapers from the base end towards the connection end in at least the outer quarter of its radial length.

In the context of the present invention, the term 'tapering' should be interpreted as 'to diminish or reduce in width towards one end'. The tapering may be gradual or it may comprises several steps, as long as it results in a decrease in the width when measuring the width of the support member at at least three evenly distributed radial distances along its radial length.

Preferably, the at least three radial distances are evenly distributed along at least fifty percent of the radial length of the support member. More preferably, the at least three radial distances are evenly distributed over the radial length of the support member. In other words, the support member, in the neutral orientation of the circumferential member, tapers from the base end towards the connection end in at least the outer half of its radial length and preferably along the entire radial length thereof.

In a preferred embodiment the support member has a cross section in a radial plane between the inner radius and the outer radius that is divided by the middle radius into a first surface area between the inner radius and the middle radius and a second surface area between the outer radius and the middle radius, wherein the middle radius is located at the middle between the inner radius and the outer radius, wherein the second surface area is less than two-thirds of the first surface area. Hence, a distribution can be obtained in which a relatively large percentage of the surface area or the mass of the support member, in cross section, is located near the base end. Consequently, the support member can be relatively rigid or stiff at the base end and along a considerable part of its radial length in the radial direction from the base end towards the connection end, before the support member actually becomes flexible enough to allow for the tilt of the circumferential member.

In another embodiment, wherein the connection width is at least half the base width or less and preferably one-third of the base width or less. The relatively small connection width means that the tilt point can be located very close to the internal surface of the circumferential member.

In a further embodiment the support member, in the neutral orientation of the circumferential member and in the axial direction, has a connection width at the outer radius, wherein the stitching surface, in the neutral orientation of the circumferential member, has a stitching width in the axial direction, wherein the connection width is at least half the stitching width or less. Preferably, the connection width is one-third of the stitching width or less. Hence, a considerable portion of the stitching surface is unsupported to facilitate tilting of the circumferential member to the tilt point.

In another embodiment the support member, in the neutral orientation of the circumferential member and in the axial direction, has a connection width at the outer radius, wherein the circumferential member, in the neutral orientation, has a thickness in the radial direction at the connection with the connection end, wherein the connection width is less than two times said thickness. With such a narrow connection width, the tilt point can be located even closer to the internal surface of the circumferential member.

In one embodiment the support member in the neutral orientation of the circumferential member and in the axial direction, has a base width at the inner radius and a connection width at the outer radius, wherein the support member has a gradually decreasing width from the base width towards the connection width. Because of the gradual decrease, the stiffness characteristics of the support member along its radial length in the radial direction can be more predictable.

Preferably, the gradual decrease is non-linear. More preferably, the gradual decrease is sinusoidal. In this way, a distribution can be obtained in which a relatively large percentage of the surface area or the mass of the support member, in cross section, is located near the base end. Consequently, the support member can be relatively rigid or stiff at the base end and along a considerable part of the distance in the radial direction from the base end towards the connection end before the support member actually becomes flexible enough to allow for the tilt of the circumferential member. Moreover, the sinusoidal increase in width from the connection end towards the base end allows for the absorption of the increasing moment generated in the support member towards the base end.

In an alternative embodiment the support member has a decreasing width, wherein the decrease is at least partially linear. The linearity of the decrease may provide more predictable behavior of the support member when a load is applied to the circumferential member. Moreover, the linear increase in width from the connection end towards the base end allows for the absorption of the increasing moment generated in the support member towards the base end.

In a further alternative embodiment, the support member has a decreasing width, wherein the decrease comprises at least one step. Hence, the width of the support member may decrease abruptly from one width to another, narrower width.

In another embodiment the flexible material of the support member has a homogenous material composition. Hence, the support member can be less complex to manufacture compared to stitching roller made of different materials with different stiffness.

In another embodiment the circumferential member comprises a first material with a first elastic modulus, wherein the flexible material of the support member comprises a second material with a second elastic modulus that is lower than the first elastic modulus. Hence, for the same thickness, width and/or structure, the material of the circumferential member can be less flexible than the material of the support member. As a result, the load exerted on the circumferential member during stitching can be absorbed largely by the support member, while the circumferential member remains relatively rigid apart from the local tilt from the neutral orientation into the tilted orientation.

In a further embodiment the support member comprises a flexible main body and one or more rigid reinforcement members connected to said flexible main body at the inner radius and the middle radius to form the first reinforcement and the second reinforcement, respectively. The rigid reinforcement members can provide a stiffness to the flexible main body at least up to the middle radius. Above the middle radius, the flexible main body can be allowed to flex in response to axial forces.

In another embodiment the internal surface, in the neutral orientation of the circumferential member, has a center in the axial direction, wherein the connection end is connected to the internal surface at the center of the internal surface. Hence, the circumferential member can be tilted in both directions equally.

In another embodiment the support member has an elastic deformation range that allows the circumferential member to tilt from the neutral orientation into the tilted orientation over a tilt angle of at least twenty degrees. Within said range, the support member can still resiliently return the circumferential member to its neutral orientation without permanent or plastic deformation.

In another embodiment the circumferential member is tiltable from the neutral orientation into the tilted orientation about a tilt point that is located in the radial direction closer to the connection end than the base end at said at least one position along the circumference. In another embodiment the tilt point is located in the radial direction in a range of less than one-quarter of the distance between the connection end and the base end from the connection end. The closer the tilt point is located to the circumferential member, the less the circumferential member will be subject to displacements in the axial direction and/or the radial direction as a result of the tilting.

In another embodiment the circumferential member, in the neutral orientation, is rotation symmetrical about the roller axis or is symmetrical with respect to a mid-plane of the stitching roller perpendicular to the roller axis. Hence, in the neutral orientation, the stitching roller is uniform along its circumference.

In another embodiment the stitching surface, in the neutral orientation of the circumferential member, is cylindrical or substantially cylindrical. The stitching surface can thus be relatively flat for pressing against the windings of the strip on the strip-winding drum.

According to a second aspect, the invention provides a tire building machine comprising the stitching roller according to any one of the embodiments of the first aspect of the invention and a tire building drum. Preferably, the tire building drum is a strip-winding drum.

The second aspect of the invention relates to the combination of the previously discussed stitching roller with a tire building drum and thus has the same technical advantages, which will not be repeated hereafter.

According to a third aspect, the invention further relates to the use of a stitching roller according to any one of the aforementioned embodiments on a tire building drum, preferably a strip-winding drum.

The third aspect of the invention relates to the practical use of the stitching roller according to the first aspect of the invention and thus has the same technical advantages, which will not be repeated hereafter.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 3:
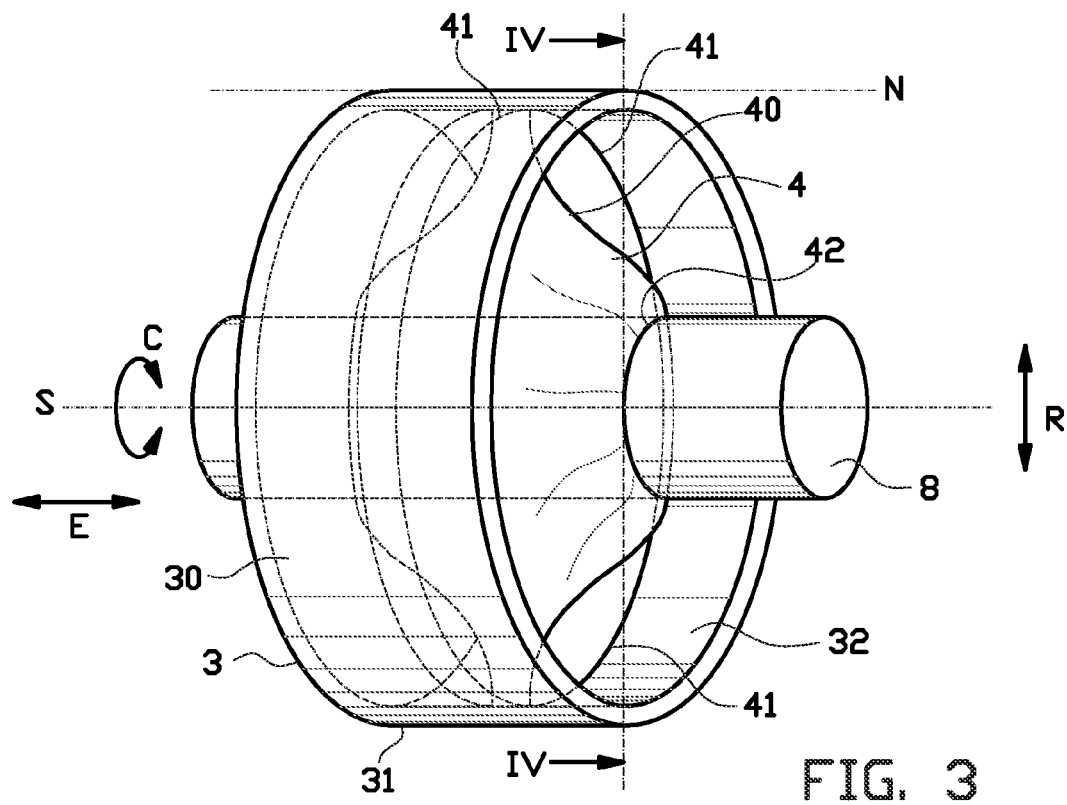
FIG. 3 shows a three-quarter view of a stitching roller according to a first embodiment of the invention.
Figure 4:
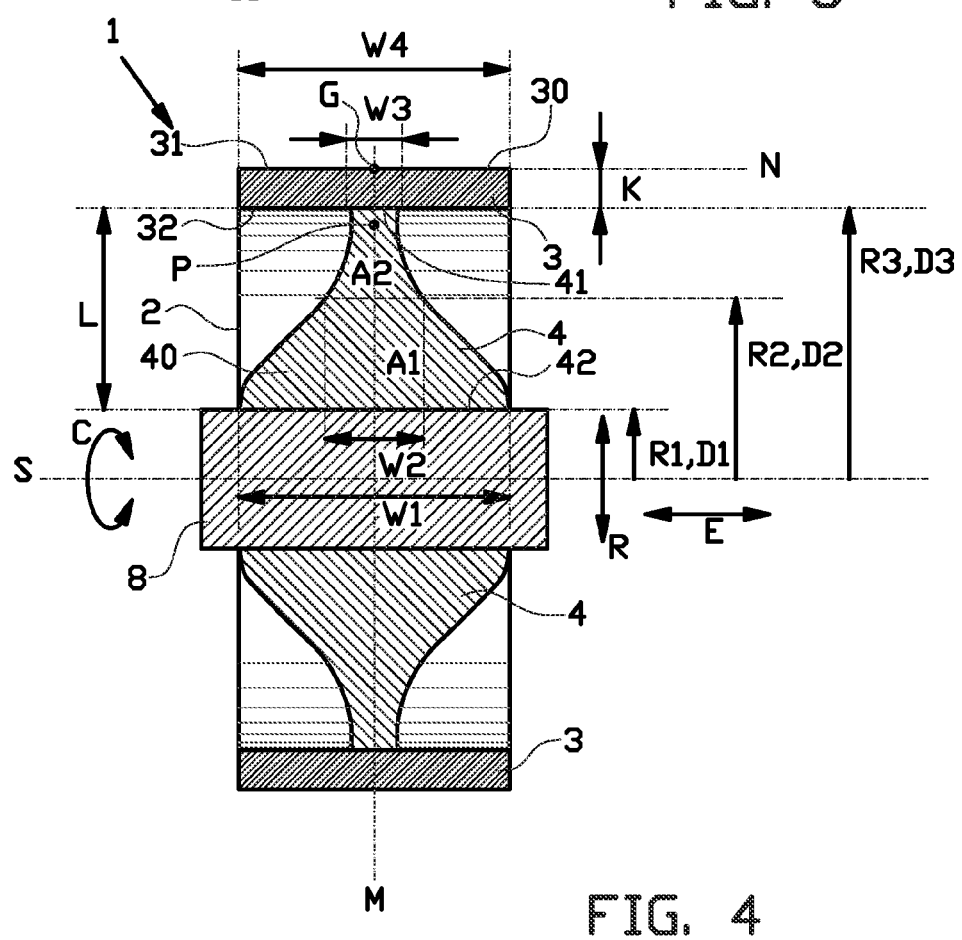
FIG. 4 shows a cross section of the stitching roller according to the line IV-IV in FIG. 3.
Figure 5:
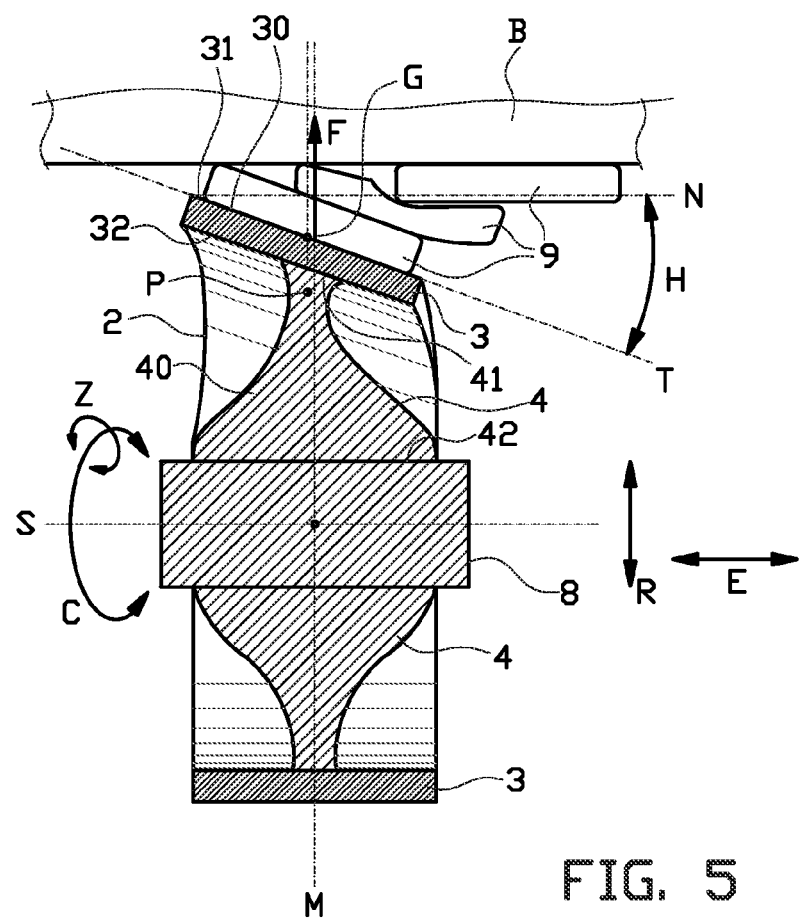
FIG. 5 shows the stitching roller of FIG. 4 during stitching of a strip on a strip-winding drum.

FIGS. 3-5 show a stitching roller 1 according to a first embodiment of the invention and the use of said stitching roller 1 for stitching a strip on a tire building drum B for manufacturing a tire. In particular, the tire building drum is a strip-winding drum B and the stitching roller 1 is used for stitching a continuous strip 9 on said strip-winding drum B during a strip-winding method.

The stitching roller 1 may be part of a tire building machine together with the tire building drum B or may be supplied separately from said tire building machine, i.e. as a replacement part.

In a strip-winding method, consecutive helical windings of the continuous strip 9 are wound around the circumferential surface of the strip-winding drum B in an overlapping configuration to build or form a tire component in a manner known per se. The first winding can be placed in a flat orientation on the strip-winding drum B. Because of the overlapping configuration, the subsequent windings are tilted at an increasingly steeper angle.

The stitching roller 1 according to the present invention is arranged to be positioned and/or adapted to the varying angles of the windings of the strip 9 in a manner that will be elucidated in more detail hereafter.

As best seen in FIG. 3, the stitching roller 1 comprises a roller body 2 that is rotatable about a roller axis S. The roller axis S defines an axial direction E parallel to said roller axis S and a radial direction R perpendicular to said roller axis S. The roller body 2 comprises a circumferential member 3 having a circumference 30 extending in a circumferential direction C about said roller axis S. The circumferential member 3 has a stitching surface 31 that, considered in the radial direction R, faces outwards away from the roller axis S. The stitching surface 31 is arranged for stitching the strip 9 by contacting, pressing or abutting against the windings of the strip 9. FIG. 3 shows the circumferential member 3 in a neutral orientation N, i.e. an orientation in which no external load is applied to the stitching surface 31. In said neutral orientation N, the stitching surface 31 is straight cylindrical, cylindrical or substantially cylindrical. In other words, in the neutral orientation N, the stitching surface 31 has a constant diameter, with respect to the roller axis S. Consequently, the stitching surface 31 is flat or substantially flat.

In FIG. 3, the circumferential member 3 is symmetrical about a mid-plane M of the stitching roller 1, perpendicular to the roller axis S. More preferably, the circumferential member 3 is rotation-symmetrical about the roller axis S.

The stitching surface 31, in the neutral orientation N of the circumferential member 3, has a stitching width W4, i.e. the effective width that can be used for stitching, in the axial direction E. The circumferential member 3 further has a thickness K in the radial direction R. The circumferential member 3 also has a center G in the axial direction E in the middle of stitching surface 31, i.e. at the center of the stitching width W4.

The circumferential member 3 further comprises an internal surface 32 that, considered in the radial direction R, faces inwards towards the roller axis S. Hence, the stitching surface 31 and the internal surface 32 are on opposite sides of the circumferential member 3. In this exemplary embodiment, the internal surface 32 is parallel or substantially parallel to the stitching surface 31.

The circumferential member 3 is relatively flexible, i.e. resiliently or elastically deformable about the circumferential direction C, i.e. in a tilt direction Z about the circumferential direction C, as shown in FIG. 5. In other words, the circumferential member 3 is elastically deformable about its circumference 30, about a circumferential line around its circumference 30, or at any position along its circumference 30 about an axis tangent to the circumference 30 or the circumferential direction C at said position. Hence, the circumferential member 3 can be tilted locally or at at least one position along its circumference 30 to change the orientation of the stitching surface 31 from the neural orientation N, as shown in FIGS. 3 and 4, to a tilted orientation T, as shown in FIG. 5. In this way, the orientation of the stitching surface 31 can be variably adapted to match the orientation of the winding of the strip 9 on the strip-winding drum B. Preferably, the circumferential member 3 is relatively rigid in the axial direction E. Note that in FIG. 5 the circumferential member 3 is elastically deformed only locally at the top of the drawing and that the rest of the circumference 30, i.e. the part of the circumference 30 near the bottom of the drawing, can remain at or near the neutral orientation N.

As best seen in FIG. 4, the roller body 2 further comprises a support member 4 extending in the circumferential direction C about the roller axis S for supporting the circumferential member 3 relative to a rotation shaft 8 at the roller axis S. The support member 4 extends between the circumferential member 3 and the rotation shaft 8. In other words, the support member 4 extends, considered in the radial direction R, on the inside of the circumferential member 3. The rotation shaft 8 can be part of the stitching roller 1 or the stitching roller 1 may be mounted to an external rotation shaft 8. The support member 4 is provided with a connection end 41 that is connected to the circumferential member 3 at the internal surface 32 and a base end 42 for coupling, connection or mounting of the stitching roller 1 to the rotation shaft 8. The base end 42 extends at an inner radius R1 with respect to the roller axis S. The connection end 41 of the support 4 is preferably connected to the internal surface 32 at or near the center thereof. The connection end 41 extends at an outer radius R3 with respect the roller axis S. The support member 4 has a radial height or a radial length L in the radial direction R between the base end 42 and the connection end 41, or between the inner radius R1 and the outer radius R3.

The support member 4 has a cross section in the radial plane of FIG. 4. Said cross section is divided by a middle radius R2 in the middle or at a half-distance between the inner radius R1 and the outer radius R3. The inner radius R1, the middle radius R2 and the outer radius R3 thus represent three radial distances D1, D2, D3 which are evenly distributed over the radial length L of the support member 4. The cross section has a first surface area A1 between the inner radius R1 and the middle radius R2 and a second surface area A2 between the outer radius R3 and the middle radius R2.

In the neutral orientation N of the circumferential member 3, the support member 4 is preferably symmetrical about the mid-plane M and/or rotation-symmetrical about the roller axis S.

In this exemplary embodiment, the support member 4 is made of a flexible material that allows for or facilitates the circumferential member 3 to perform the aforementioned tilt from the neutral orientation N into the tilted orientation T at said at least one position along the circumference 30. In particular, the support member 4 allows for a tilt of the circumferential member 3 about a tilt point P relative to the base end 42 of the support member 4.

To properly position the stitching surface 31 relative to one of the windings of the strip 9 on the strip-winding drum B, the Applicant has found that it is ideal if said tilt point P is located as close as possible to or near the circumferential member 3, in particular as close as possible to the center G of the stitching surface 31. The tilt point P should at least be closer to the circumferential member 3 than the roller axis S in said at least one circumferential position. When the pivot point P is close to the circumferential member 3, the circumferential member 3 can essentially tilt about itself with virtually no displacement X or offset of the center G of the stitching surface 31 in the axial direction E and/or the radial direction R. Hence, all or at least a considerable part of the stitching force exerted onto the stitching roller 1 in the radial direction R can be transferred via the circumferential member 3 onto the windings of the strip 9 to reliably stitch said windings.

To ensure that the tilt point P is located as close as possible to the circumferential member 3, the support member 4, in the neutral orientation N of the circumferential member 3, is reinforced at the base end 42 with respect to the connection end 41. In this example, the support member 4 tapers or narrows from the base end 42 towards the connection end 41. More in particular, the support member 4 has a base width W1 in the axial direction E at the base end 42 and a connection width W3 in the axial direction E at the connection end 41, which connection width W3 is half the base width W1 or less. Preferably, the connection width W3 is less than half the thickness K of the circumferential member 3 or less. In this exemplary embodiment, the connection width W3 is one-sixth of the base width W1. The tapering essentially weakens the support member 4 in a position close to the internal surface 32 of the circumferential member 3. As a result, the tilt point P can be located very close to the internal surface 3 of the circumferential member 3.

In the context of the present invention, the term 'tapering' should be interpreted as 'to diminish or reduce in width towards one end'. The tapering may be gradual, or it may comprise several steps, as long as it results in a decrease in the width V1, V2, V3 when measuring the width of the support member 4 at at least three evenly distributed radial distances D1, D2, D3 along its radial length L. In this particular example, the support member 4 has a base width W1 (V1) at the inner radius R1 (the first radial distance D1), an middle width W2 (V2) at the middle radius R2 (the second radial distance D2) and a connection width W3 (V3) at the outer radius R3 (the third radial distance D3), wherein the middle width W2 is smaller than the base width W1 and the connection width W3 is smaller than the middle width W2. Hence, the widths W1, W2, W3 (V1, V2, V3) become progressively and/or increasingly smaller towards the connection end 41.

In other words the support member 4, in an axial direction E parallel to the roller axis S, comprises a first reinforcement (the middle width W2) at the middle radius R2, that reinforces the axial stiffness of the support member 4 with respect to the axial stiffness at the outer radius R3 and a second reinforcement (the base width W1) at the inner radius R3 that reinforces the axial stiffness of the support member 4 with respect to the axial stiffness at the outer radius R3 to a greater extent than the first reinforcement.

In this exemplary embodiment, as shown in FIG. 4, the support member 4 has a gradually decreasing width from the base width W1 (V1) towards the connection width W3 (V3). The gradual decrease progressively weakens the support 4 in the radial direction R from the base end 42 towards the connection end 41. Preferably, the decrease is non-linear, starting relatively slow from the base end 42 and increasing towards the connection end 41 before slowing down again. In this particular example, the decrease in width has a sinusoidal shape. Hence, a distribution can be obtained in which a relatively large percentage of the surface area or the mass of the support member 4, in cross section, is located near the base end 42. As a consequence, the second surface area A2 is less than one-third of the first surface area A1. Consequently, the support member 4 can be relatively rigid or stiff at the base end 42 and along a considerable part of the distance in the radial direction R from the base end 42 towards the connection end 41, before the support member 4 actually becomes flexible enough to allow for the tilt of the circumferential member 3.

Note that the connection width W3 (V3) is also at least three times smaller than the stitching width W4. Hence, the connection end 41 of the support member 4 is relatively small compared to the stitching surface 31. Preferably, the transition from the internal surface 32 to the connection end 41 is relatively abrupt, i.e. with an acute or sharp angle.

Preferably, the flexible material of the support member 4 has a uniform or homogenous material composition. More preferably, the support member 4 is completely solid, i.e. without any cavities or open structures. Hence, the support member 4 is less complex to manufacture.

The support member 4 has an elastic deformation range that allows the circumferential member 3 to tilt from the neutral orientation N into the tilted orientation T over a tilt angle H of at least twenty degrees.

In this particular embodiment, the circumferential member 3 and the support member 4 are made from different materials. More in particular, the circumferential member 3 comprises a first material with a first elastic modulus, wherein the flexible material of the support member 4 comprises a second material with a second elastic modulus that is lower than the first elastic modulus. Hence, for the same thickness, width and/or structure, the material of the circumferential member 3 is be less flexible than the material of the support member 4. As a result, the load exerted on the circumferential member 3 during stitching can be absorbed largely by the support member 4, while the circumferential member 3 remains relatively rigid apart from the local tilt from the neutral orientation N into the tilted orientation T.

The difference between the base width W1 (V1) and the connection width W3 (V3) influences the axial stiffness or rigidity of said support member 4 and moves the tilt point P as a close as possible to the stitching surface 31 of the circumferential member 3. In particular, the tilt point P is located in the radial direction R closer to the connection end 41 than the base end 42 at said at least one position along the circumference 30. Preferably, the tilt point P is located in the radial direction R in a range of less than one-quarter of the distance between the connection end 41 and the base end 42 from the connection end 41.

Figure 1:
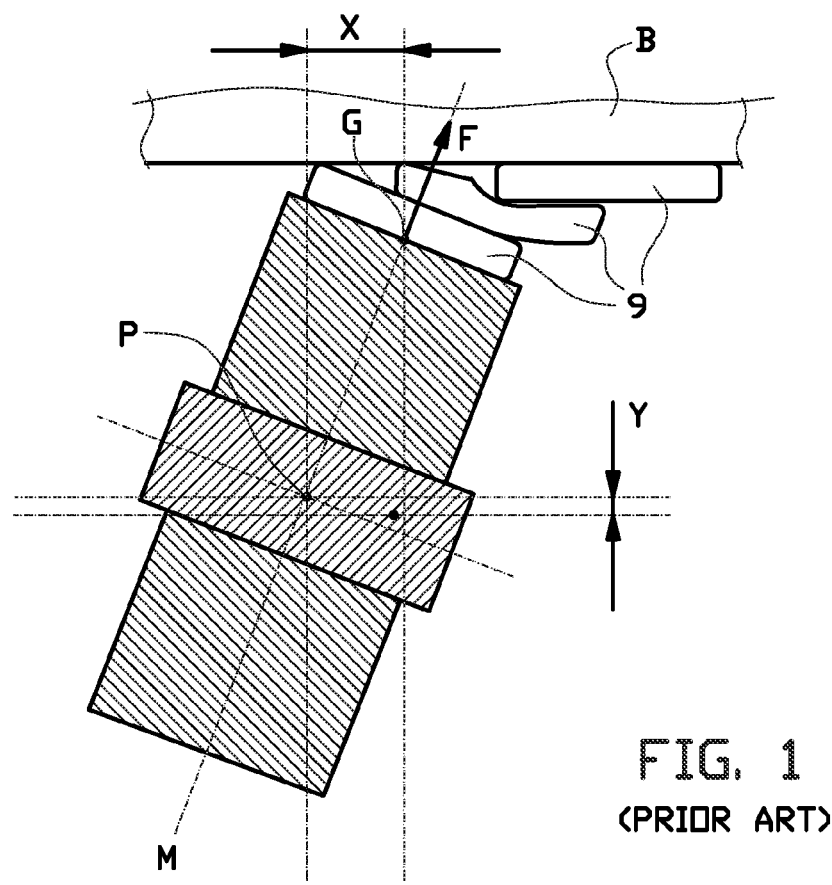
FIG. 1 shows a cross section of a known pressure roller according to the prior art.
Figure 2:
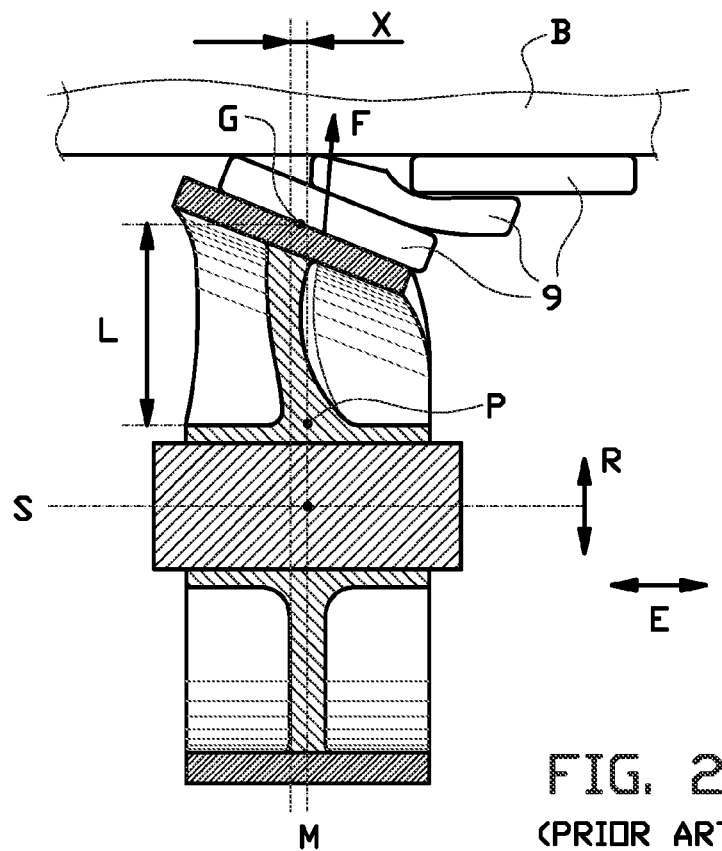
FIG. 2 shows a cross section of a further stitching roller according to the prior art.

In comparison, in the prior art stitching roller according to FIG. 2, the support member has a constant width which causes said support member to deflect under the load on the circumferential member about a tilt point P close to or at the base end. Consequently, the circumferential member is not only tilted, but its center G is also shifted or displaced in the axial direction E with respect to the mid-plane M of the stitching roller over a displacement distance X that is larger than five percent of the stitching width. The stitching surface is misaligned with respect to the winding of the strip, the stitching force is exerted onto the windings at an oblique angle to the roller axis S, as schematically reflected with arrow F in FIG. 2, and the known stitching roller will tend to push itself away from the winding, rather than pressing it. Moreover, during the deflection, at least a part of the stitching force F exerted on the roller body in the radial direction R is absorbed by the support member rather than being transmitted onto the circumferential member.

In contrast, the circumferential member 3 in the stitching roller 1 according to the present invention can tilt between the neutral orientation N and the tilted orientation T about the tilt point P closer to its internal surface 32 while displacements in the axial direction E or the radial direction R are prevented. In other words, the stitching member 3, apart from its tilt about the tilt point P, substantially stays in the same position in the axial direction E and the radial direction R relative to the windings of the strip 9. In this particular example, the displacement distance X remains smaller than five percent of the stitching width W4. Hence, in the tilted orientation T of FIG. 5, stitching forces exerted onto the roller body 2 in the radial direction R can be predominantly transmitted through the support member 4 in the radial direction R onto the circumferential member 3 as if the circumferential member 3 was still in the neutral orientation N of FIG. 4. In other words, the stitching force F exerted by the stitching roller 1 onto the windings of the strip 9 on the strip-winding drum B can be kept perpendicular or substantially perpendicular to the rotation axis of the strip-winding drum B.

In view of the above, it will be clear that the stitching roller 1 according to the present invention provides considerable technical advantages over the stitching rollers known in the art. In particular, the stitching roller according to the invention can more reliably press or stitch the windings of the strip on the strip-winding drum, is relatively simple in manufacture and does not require a complex control system to correct and/or compensate for displacements as a result of the tilt of its circumferential member.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

Figure 6:
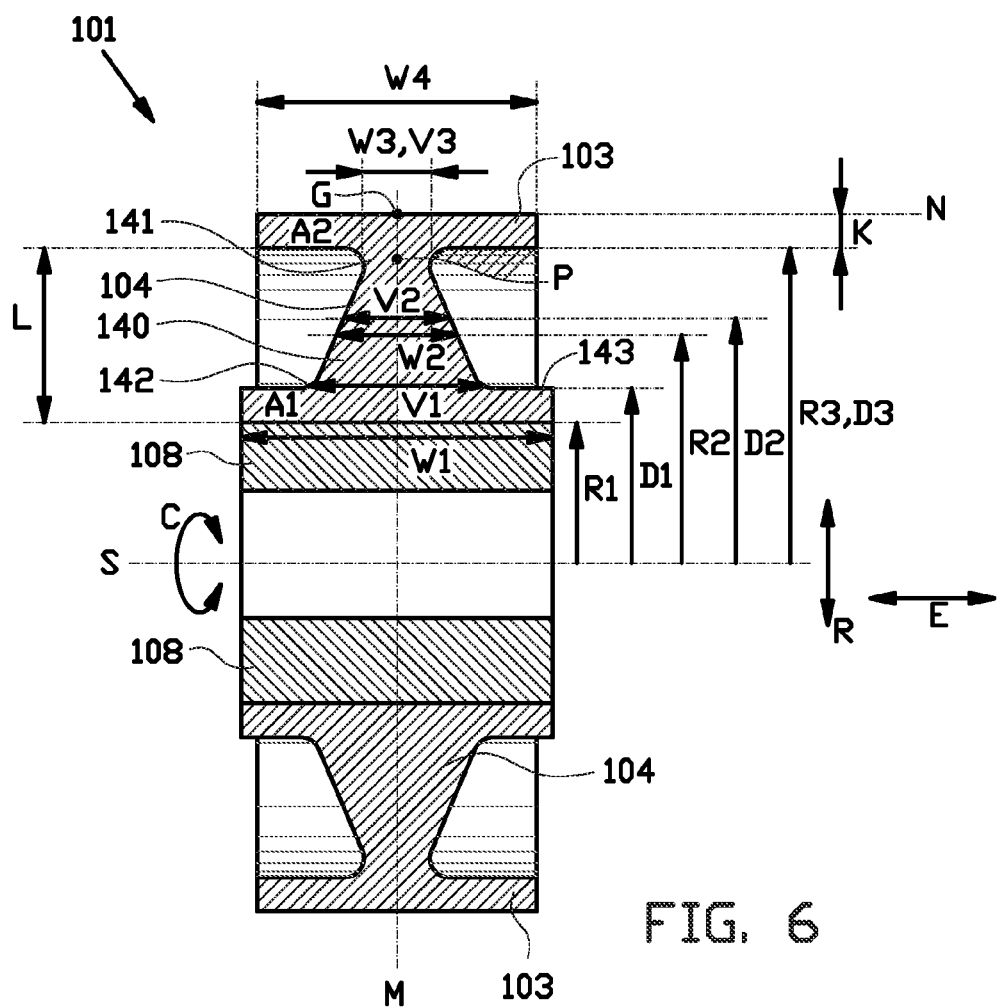
FIG. 6 shows a cross section of an alternative stitching roller according to a second embodiment of the invention.

For example, FIG. 6 shows an alternative stitching roller 101 according to a second embodiment of the invention. The alternative stitching roller 101 differs from the previously discussed stitching roller 1 in that its dimensions are slightly different. In particular, the support member 104 is provided with a support body 140 that has a connection end 141 that is rounded in the transition from the support body 140 to the circumferential member 103. The base end 142 is shaped as a flange 143 that connects the alternative stitching roller 101 to the rotation shaft 108. In this example, the flange 143 at the base end 142 is connected or coupled to the rotation shaft 108 by vulcanizing at least the part of the rubber material in said flange 143 that extends around the rotation shaft 108. The rest of the support body 140, in particular towards the connection end 141, remains unvulcanized and flexible. In this example, the circumferential member 103 and the support member 104 are made from the same material. Preferably, the circumferential member 103 and the support member 104 are integral or made from a single piece of material.

Note that the tapering in the support body 140 comprises a step from the base width W1 at the inner radius R1 to an first decreasing width V1 at a first radial distance D1, before it continues to taper gradually (see decreasing widths V1, V2, V3) along three evenly distributed radial distances D1, D2, D3. Hence, the three evenly distributed radial distances D1, D2, D3 are distributed over only a part of the radial length L of the support member 104, starting from the first radial distance D1 up to the third radial distance D3 at the outer radius R4.

In this exemplary embodiment, the tapering of the support body 140 from the first radial distance D1 towards the connection end 141 is linear or substantially linear. The support body 140 thus tapers, initially with a step W1, V1 and then linearly. As a result, the width W1, V1, V2, V3 of the support body 140, when measured at the inner radius R1, and the three radial distances D1, D2, D3 tapers or decreases such that the width V2 at the second radial distance D2 is smaller than the base width W1 at the inner radius R1 and the connection width W3 (V3) at the outer radius R3 is smaller than the width V2 at the second radial distance D2.

The tapering of the support body 140 can now be defined in two ways:

In a first definition, the support body 140 tapers from base width W1 at the inner radius R1 to a decreasing width V2 at the middle radius R2 and continues to taper to the connection width W3 (V3) at the outer radius R3. In this definition, the first part of the tapering thus includes the step from the base width W1 to the decreasing width V1 at the first radial distance D1. As the width is decreased along three evenly distributed radial distances (the inner radius R1, the middle radius R2 and the outer radius R3), the support body 140 is sufficiently weakened to facilitate the tilting of the circumferential member 103 about the tilt point P.

In a second definition, the support body 140 tapers gradually from the first radial distance D1 up to the third radial distance D3. In this definition, the step in the width from the base width W1 to the width V1 at the first radial distance D1 is excluded. Hence, the even distribution of the three radial distances D1, D2, D3 is slightly different from the distribution of the inner radius R1, the middle radius R2 and the outer radius R3. The distribution depends on the starting point defined by the first radial distance D1 which can be at any location between the inner radius R1 and up to twenty five percent of the radial length L of the support body 140 as viewed, considered or measured from the connection end 141.

Moreover, the stitching width W4 as shown in FIG. 6 is slightly smaller than the base width W1.

Figure 7:
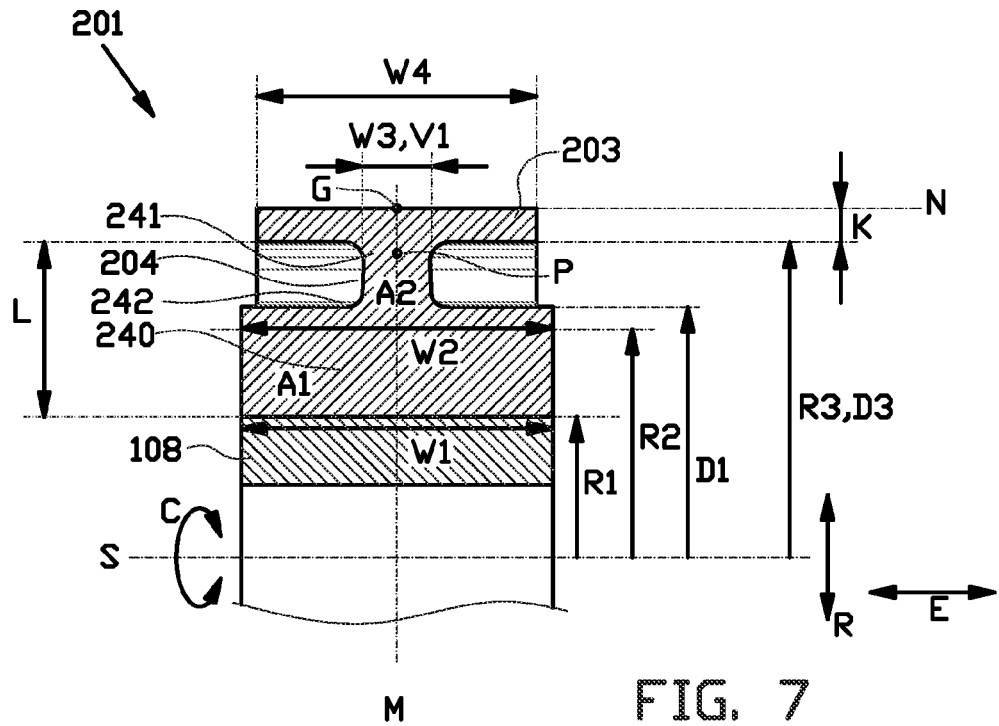
FIG. 7 shows a cross section of a further alternative stitching roller according to a third embodiment of the invention.

FIG. 7 shows a further alternative stitching roller 201 according to a third embodiment of the invention, which differs from the alternative stitching roller 101 according to the second embodiment of the invention in that its support body 240 has a decreased width V1 from a first radial distance D1 that is located at at least twenty-five percent of the radial length L of the support member 204 from the connection end 241, or alternatively formulated within less than seventy-five percent from the radial length L of the support member 204 from the base end 242. In other words, the support member 204 has a decreased width V1 over only the outer quarter of the radial length L of said support member 204. Note that the decreased width V1 is constant along said outer quarter of the radial length L. Alternatively, the support member 204 may taper towards the connection end 242 over the outer quarter of the radial length L. This embodiment is representative of the minimum requirements that would allow the circumferential member 203 to tilt about a tilt point P close to the inner surface of said circumferential member 203.

Note that in this particular example, the middle radius R2 between the inner radius R1 and the outer radius R3 of the support member 204 is located at a position where the width W1 of the support member 204 has not decreased yet.

In other words the support member 204, in an axial direction E parallel to the roller axis S, comprises a first reinforcement (the middle width W2) at the middle radius R2, that reinforces the axial stiffness of the support member 204 with respect to the axial stiffness at the outer radius R3 and a second reinforcement (the base width W1) at the inner radius R3 that reinforces the axial stiffness of the support member 204 with respect to the axial stiffness at the outer radius R3 to an extent equal to the first reinforcement.

Figure 8:
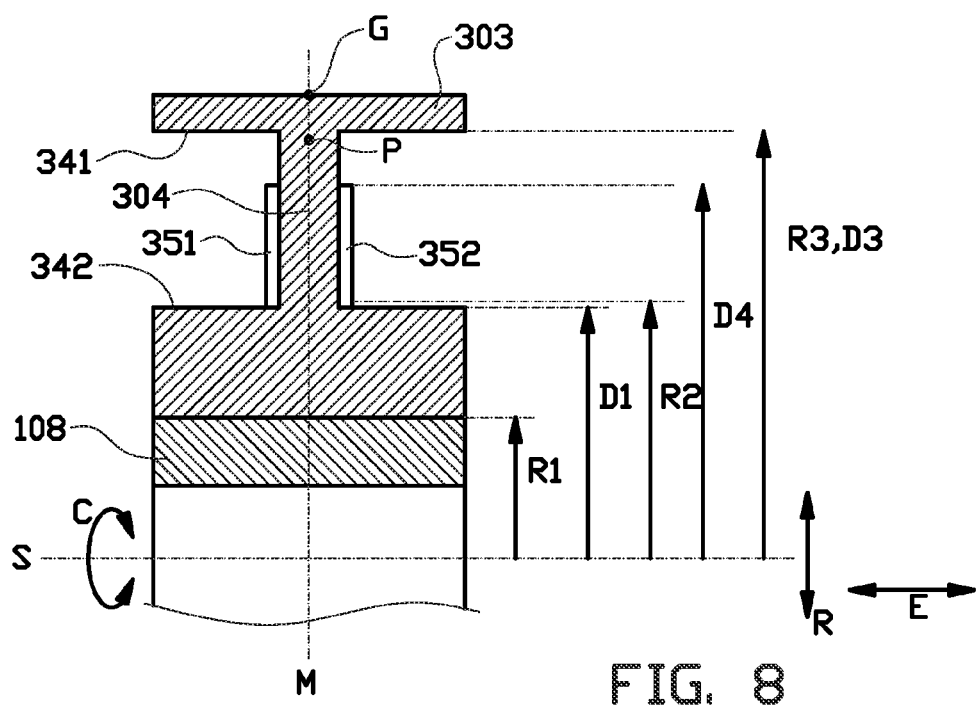
FIG. 8 shows a cross section of a further alternative stitching roller according to a fourth embodiment of the invention.

FIG. 8 shows a further alternative stitching roller 301 according to a fourth embodiment of the invention, which differs from the previously discussed stitching rollers 1, 101, 201 in that its support member 304 is not made from a single, homogenous material. Instead, the support member 304 is formed by a combination of members having different material properties, in particular different elastic moduli.

As shown in FIG. 8, the support member 304 comprises a support body 304 formed by a flexible main body 350 and one or more rigid reinforcement members 351, 352 which are connected to said flexible main body 350 at the inner radius R1 and the middle radius R2. At said connections, the rigid reinforcement members 351, 352 can form the first reinforcement and the second reinforcement, respectively. The flexible main body 350 may have a constant width W1 from the base end 342 to the connection end 341. Alternatively, the width may vary along its radial length L, for example to recess the rigid reinforcement members 351, 352 until they lie flush with the rest of the flexible main body 350.

In this exemplary embodiment, the stitching roller 301 comprises a first rigid reinforcement member 351 extending in the circumferential direction C along one side of the flexible main body 350 in the axial direction E and a second rigid reinforcement member 352 extending in the circumferential direction C along the other side of the flexible main body 350 in the axial direction E. The rigid reinforcement members 351, 352 may for example be formed as rings which are attached directly to the axial sides of the main flexible body 350.

Consequently, the support member 304 is reinforced from the base end 342 at least up to the middle radius R2. The part of the flexible main body 350 that is not in between the rigid reinforcement members 351, 352, i.e. the part from the middle radius R2 up to the connection end 341, is free to flex or bend to facilitate the pivoting of the circumferential member 303 about a pivot point P within said free part of the flexible main body 350.

In summary, the invention relates to a stitching roller 1, 101, 201, 301 for stitching a tire component 9, wherein the stitching roller 1, 101, 201, 301 comprises a roller body 2 that is rotatable about a roller axis S, wherein the roller body 2 comprises a circumferential member 3, 103, 203, 303 and a support member 4, 104, 204, 304 provided with a connection end 41, 141 that is connected to the circumferential member 3, 103, 203, 303 and a base end 42, 142, 242, 342 for coupling of the stitching roller 2 to a rotation shaft 8, 108, wherein the support member 4, 104, 204, 304 is made of a flexible material that allows for the circumferential member 3, 103, 203, 303 to tilt relative to the base end 42, 142, 242, 342 from a neutral orientation N into a tilted orientation T, wherein the support member 4, 104, 204, 304 comprises one or more reinforcements W1, W2, 351, 352 that reinforce the axial stiffness of the support member 4, 104, 204, 304 from the outer radius R3 towards the inner radius R1.

The invention claimed is:

1. A tire building machine comprising:
a stitching roller for stitching a strip; and
a tire building drum,
wherein the stitching roller comprises a roller body that is rotatable about a roller axis,
wherein the roller body comprises a circumferential member having a circumference extending about the roller axis,
wherein the circumferential member defines a stitching surface that, considered in a radial direction perpendicular to the roller axis, faces away from the roller axis and an internal surface that, considered in the radial direction, faces towards the roller axis,
wherein the roller body further comprises a support member extending in a circumferential direction about the roller axis for supporting the circumferential member relative to a rotation shaft,
wherein the support member has a connection end that is connected to the circumferential member at the internal surface, a base end for coupling of the stitching roller to the rotation shaft and a radial length in the radial direction between the base end and the connection end,
wherein the circumferential member is elastically deformable in a tilt direction about the circumferential direction,
wherein the support member is made of a flexible material that allows for the circumferential member to tilt relative to the base end from a neutral orientation into a tilted orientation at at least one position along the circumference,
wherein the support member, in the neutral orientation of the circumferential member, has an inner radius at the base end, an outer radius at the connection end and a middle radius at the middle between the inner radius and the outer radius,
wherein the support member, in an axial direction parallel to the roller axis, comprises a first reinforcement at the middle radius that reinforces an axial stiffness of the support member with respect to an axial stiffness of the support member at the outer radius such that the axial stiffness of the support member at the middle radius is greater than the axial stiffness of the support member at the outer radius.

2. The tire building machine according to claim 1, wherein the support member comprises a second reinforcement at the inner radius that reinforces the axial stiffness of the support member with respect to the axial stiffness of the support member at the outer radius to the same extent as or to a greater extent than the first reinforcement.

3. The tire building machine according to claim 2, wherein the support member comprises a flexible main body and one or more rigid reinforcement members connected to said flexible main body at the inner radius and the middle radius to form the first reinforcement and the second reinforcement, respectively.

4. The tire building machine according to claim 2, wherein the support member, in the neutral orientation of the circumferential member and in the axial direction, has a base width at the inner radius, a middle width at the middle radius and a connection width at the outer radius, wherein the second reinforcement is formed by the base width being larger than or equal to the middle width.

5. The tire building machine according to claim 1, wherein the support member, in the neutral orientation of the circumferential member and in the axial direction, has a base width at the inner radius, a middle width at the middle radius and a connection width at the outer radius, and
wherein the first reinforcement is formed by the middle width being larger than the connection width.

6. The tire building machine according to claim 5, wherein the connection width is half the base width or less.

7. The tire building machine according to claim 1, wherein the support member, in the neutral orientation of the circumferential member has a decreasing width from the base end towards the connection end at at least three evenly distributed radial distances along the radial length of the support member from the connection end.

8. The tire building machine according to claim 7, wherein the at least three radial distances are evenly distributed along at least fifty percent of the radial length of the support member.

9. The tire building machine according to claim 7, wherein the at least three radial distances are evenly distributed over the radial length of the support member.

10. The tire building machine according to claim 1, wherein the support member has a cross section in a radial plane between the inner radius and the outer radius that is divided by the middle radius into a first surface area between the inner radius and the middle radius and a second surface area between the outer radius and the middle radius,
wherein the middle radius is located at the middle between the inner radius and the outer radius, wherein the second surface area is less than two-thirds of the first surface area.

11. The tire building machine according to claim 1, wherein the support member, in the neutral orientation of the circumferential member and in the axial direction, has a connection width at the outer radius, wherein the stitching surface, in the neutral orientation of the circumferential member, has a stitching width in the axial direction,
wherein the connection width is half the stitching width or less.

12. The tire building machine according to claim 1, wherein the support member, in the neutral orientation of the circumferential member and in the axial direction, has a connection width at the outer radius,
wherein the circumferential member, in the neutral orientation, has a thickness in the radial direction at the connection with the connection end,
wherein the connection width is less than two times said thickness.

13. The tire building machine according to claim 1, wherein the support member, in the neutral orientation of the circumferential member and in the axial direction, has a base width at the inner radius and a connection width at the outer radius,
wherein the support member has a gradually decreasing width from the base width towards the connection width.

14. The tire building machine according to claim 13, wherein the gradual decrease is non-linear.

15. The tire building machine according to claim 13, wherein the gradual decrease is sinusoidal.

16. The tire building machine according to claim 1, wherein the support member has a decreasing width, wherein the decrease is at least partially linear.

17. The tire building machine according to claim 1, wherein the support member has a decreasing width, wherein the decrease comprises at least one step.

18. The tire building machine according to claim 1, wherein the flexible material of the support member has a homogenous material composition.

19. The tire building machine according to claim 1, wherein the circumferential member comprises a first material with a first elastic modulus,
wherein the flexible material of the support member comprises a second material with a second elastic modulus that is lower than the first elastic modulus.

20. The tire building machine according to claim 1, wherein the internal surface, in the neutral orientation of the circumferential member, has a center in the axial direction,
wherein the connection end is connected to the internal surface at the center of the internal surface.

21. The tire building machine according to claim 1, wherein the support member has an elastic deformation range that allows the circumferential member to tilt from the neutral orientation into the tilted orientation over a tilt angle of at least twenty degrees.

22. The tire building machine according to claim 1, wherein the circumferential member is tiltable from the neutral orientation into the tilted orientation about a tilt point that is located in the radial direction closer to the connection end than the base end at said at least one position along the circumference.

23. The tire building machine according to claim 22, wherein the tilt point is located in the radial direction in a range of less than one-quarter of the distance between the connection end and the base end from the connection end.

24. The tire building machine according to claim 1, wherein the circumferential member, in the neutral orientation, is rotation symmetrical about the roller axis or is symmetrical with respect to a mid-plane of the stitching roller perpendicular to the roller axis.

25. The tire building machine according to claim 1, wherein the stitching surface, in the neutral orientation of the circumferential member, is cylindrical.

26. The tire building machine according to claim 1, wherein the tire building drum is a strip-winding drum.

27. A method of stitching a strip, the method comprising:
providing a stitching roller on a tire building drum,
wherein the stitching roller comprises a roller body that is rotatable about a roller axis,
wherein the roller body comprises a circumferential member having a circumference extending about the roller axis,
wherein the circumferential member defines a stitching surface that, considered in a radial direction perpendicular to the roller axis, faces away from the roller axis and an internal surface that, considered in the radial direction, faces towards the roller axis,
wherein the roller body further comprises a support member extending in a circumferential direction about the roller axis for supporting the circumferential member relative to a rotation shaft,
wherein the support member has a connection end that is connected to the circumferential member at the internal surface, a base end for coupling of the stitching roller to the rotation shaft and a radial length in the radial direction between the base end and the connection end,
wherein the circumferential member is elastically deformable in a tilt direction about the circumferential direction,
wherein the support member is made of a flexible material that allows for the circumferential member to tilt relative to the base end from a neutral orientation into a tilted orientation at at least one position along the circumference,
wherein the support member, in the neutral orientation of the circumferential member, has an inner radius at the base end, an outer radius at the connection end and a middle radius at the middle between the inner radius and the outer radius,
wherein the support member, in an axial direction parallel to the roller axis, comprises a first reinforcement at the middle radius that reinforces an axial stiffness of the support member with respect to an axial stiffness of the support member at the outer radius such that the axial stiffness of the support member at the middle radius is greater than the axial stiffness of the support member at the outer radius; and
stitching with said stitching roller a strip on said tire building drum.

28. The method according to claim 27, wherein the tire building drum is a strip-winding drum.

* * * * *